(12) United States Patent
Platzer et al.

(10) Patent No.: US 9,906,101 B2
(45) Date of Patent: Feb. 27, 2018

(54) ACTUATOR WITH AN ASSEMBLY FOR ELECTRICAL MANUAL ACTUATION OF AN ACTUATOR

(75) Inventors: Wilfried Platzer, Freiburg (DE); Benjamin Hofmann, Mullheim (DE); Henrik Newerla, Neuenburg (DE)

(73) Assignee: AUMA Riester GmbH + Co. KG, Ausmastrasse 1, Mullheim (DE)

( * ) Notice: Subject to any disclaimer, the term of this patent is extended or adjusted under 35 U.S.C. 154(b) by 1002 days.

(21) Appl. No.: 14/128,764

(22) PCT Filed: Jun. 28, 2012

(86) PCT No.: PCT/EP2012/002719
§ 371 (c)(1),
(2), (4) Date: Dec. 23, 2013

(87) PCT Pub. No.: WO2013/004360
PCT Pub. Date: Jan. 10, 2013

(65) Prior Publication Data
US 2014/0125067 A1  May 8, 2014

(30) Foreign Application Priority Data
Jul. 4, 2011 (DE) .......................... 10 2011 106 372

(51) Int. Cl.
*E05F 15/635* (2015.01)
*E05F 15/63* (2015.01)
*H02K 7/18* (2006.01)

(52) U.S. Cl.
CPC ........... *H02K 7/1861* (2013.01); *E05F 15/63* (2015.01); *E05F 15/635* (2015.01); *E05Y 2400/616* (2013.01); *H02K 2213/06* (2013.01)

(58) Field of Classification Search
None
See application file for complete search history.

(56) References Cited

U.S. PATENT DOCUMENTS

| | | | | |
|---|---|---|---|---|
| 3,946,984 A * | 3/1976 | Sutter | ..................... | F16K 31/05 251/129.03 |
| 4,021,015 A * | 5/1977 | Maeder | ................... | F16K 31/05 251/129.11 |
| 4,039,874 A * | 8/1977 | Sutter | ..................... | F16K 31/05 310/77 |
| 4,050,000 A * | 9/1977 | Sutter | ..................... | F16K 31/05 200/61.39 |
| 4,875,504 A * | 10/1989 | Nicholson | ............. | F16K 31/046 137/899 |

(Continued)

FOREIGN PATENT DOCUMENTS

| | | |
|---|---|---|
| DE | 4028497 A1 | 3/1992 |
| DE | 112006003797 T5 | 1/2009 |

(Continued)

*Primary Examiner* — Ronald Hartman, Jr.
(74) *Attorney, Agent, or Firm* — Bacon & Thomas, PLLC (57) ABSTRACT

An apparatus for automation technology, comprising an actuator and an assembly for manual actuation of the actuator, wherein an electrical drive or an electro hydraulic drive is provided as the driving element for the actuator. The assembly includes a generator and a manual actuating element for the generator and wherein the assembly can be electrically coupled with the driving element of the actuator.

10 Claims, 9 Drawing Sheets

(56) References Cited

U.S. PATENT DOCUMENTS

| | | | | |
|---|---|---|---|---|
| 6,098,735 | A * | 8/2000 | Sadarangani | B60K 6/448 180/165 |
| 6,737,757 | B1 * | 5/2004 | Stiesdal | H02K 17/42 290/43 |
| 8,424,838 | B2 * | 4/2013 | Dolenti | F03G 1/02 137/554 |
| 2005/0250610 | A1 * | 11/2005 | Fruehwald | F16H 35/10 475/149 |
| 2006/0081800 | A1 * | 4/2006 | Riester | F16K 31/05 251/129.01 |
| 2007/0210733 | A1 * | 9/2007 | Du | H02K 1/278 318/268 |
| 2008/0110092 | A1 * | 5/2008 | Takahashi | E05F 15/41 49/28 |
| 2009/0230338 | A1 * | 9/2009 | Sanders | G05B 19/39 251/129.01 |
| 2010/0126307 | A1 * | 5/2010 | Rho | F16K 31/05 74/720 |
| 2012/0019109 | A1 * | 1/2012 | Rosengren | H02K 7/00 310/75 B |
| 2012/0211688 | A1 * | 8/2012 | Carlson | F16K 31/043 251/291 |
| 2013/0199322 | A1 * | 8/2013 | Dolenti | F03G 1/02 74/89.14 |

FOREIGN PATENT DOCUMENTS

| | | |
|---|---|---|
| EP | 0475301 A2 | 3/1992 |
| JP | 2002201692 A | 7/2002 |

* cited by examiner

ACTUATOR WITH AN ASSEMBLY FOR ELECTRICAL MANUAL ACTUATION OF AN ACTUATOR

TECHNICAL FIELD

The invention relates to an apparatus for automation technology, composed of an actuator and an assembly for manual actuation of the actuator, wherein an electrical drive or an electro hydraulic drive is provided as the driving element for the actuator.

BACKGROUND DISCUSSION

Electrical actuators are used in automation technology for control of machine, or apparatus, parts serving for handling or monitoring. A preferred example of such a part is a control element, such as a valve, a gate, a throttle or a baffle. Depending on the control element, the actuation, respectively displacement, is a rotary, translational or a combined rotary, translational movement.

Electrical actuators for these machine, or apparatus, parts must be designed such that they can transmit high torques (30-500,000 Nm) at low RPM (4-180 RPM), wherein the transmitted torque must be highly constant during small angles of rotation. In the case of known actuators, the torque transmission between electric motor and the machine, or apparatus, part occurs via a speed reduction transmission, which, depending on application, can be very differently embodied. The speed reduction transmission is necessary, among other things, in order to convert the high RPM of the electric motor into the desired highly constant output RPM for actuating the machine, or apparatus, part. Applied as speed reduction transmission can be any suitable type of transmission. Examples include bevel or spur gear transmissions, worm gear transmissions, superimposed transmissions or lever transmissions. Auma Riester GmbH+Co. KG manufactures and sells actuators suitable for the most varied of applications. Thus, torque can amount up to 32,000 Nm in the case of completely revolving, rotary drives, while, in the case of rotary drives with less than 360 degree range, torques up to 500,000 Nm can be implemented.

By way of example, the principle of construction of a known actuator will now be described: For reducing the RPM of the electric motor to the output RPM, with which the machine, or apparatus, part is actuated, there is combined with a planetary gear transmission a worm gear transmission having a worm shaft, a worm and a worm gear, or wheel. In order to assure that the worm gear transmission remains in the desired rest position in the case of shutdown of the electric motor, the worm gear transmission is self-locking. Worm shaft and hollow output shaft with worm gear, or wheel, turn usually in ball bearings, respectively dry sliding bearings.

The worm is arranged shiftably on the worm shaft between two measuring spring packages, so that the worm experiences a translational movement relative to the worm shaft in the case of a torque to be transmitted. This shifting, which is a measure for torque to be transmitted, is forwarded to a control unit. The transmission interior is filled with lubricant, so that maintenance free operation is assured over an extended period of time.

Depending on the type of construction of the machine, or apparatus, part, the rotary drive must be turned off in the end positions path dependently, or torque dependently. For this, usually two independent measuring systems are provided in the control unit, namely a path circuit and a torque circuit, which measure the traveled actuation path, respectively the torque applied on the output shaft. The reaching of a desired end position is signaled to the control unit via a switch, and the control unit then turns the electric motor off.

In order to fulfill a safety standard specified in automation technology, the actuator must be able to be operated in an emergency via a separately actuatable, adjusting wheel. This adjusting wheel is used, moreover, also, for example, in the case of start-up of the actuator. The adjusting wheel is usually a handwheel, which is manually actuated by operating personnel, so that the machine, or apparatus, part is brought into a desired position. The adjusting wheel can, furthermore, be a crank or some other lever mechanism, e.g. a detent mechanism.

For the purpose of isolating hand operation and motor operation, a coupling mechanism is provided. The coupling mechanism is usually so embodied and/or arranged that, in motor operation, the rotor is directly coupled with the output shaft and the adjusting wheel is uncoupled, while in hand operation, respectively manual actuation, the output shaft is coupled with the adjusting wheel and the rotor is uncoupled. In this way, isolation of motor operation from hand operation is achieved. The coupling mechanism is preferably embodied in such a manner that the adjusting wheel is automatically uncoupled from the rotor shaft, as soon as the actuator works in motor operation—motor operation thus has precedence over hand operation.

Disadvantageous in the case of known actuators with a manually actuatable adjusting wheel is that a spatial isolating of adjusting wheel and actuator is only possible via relatively complex, supplemental constructions. These supplemental constructions mean increased manufacturing costs and supplemental space requirement.

SUMMARY OF THE INVENTION

An object of the invention is to provide a simple and cost effective solution for the manual actuation of an actuator.

The object is achieved by features including that the assembly of the invention has for manual actuation of the actuator a generator and a manual actuating element for the generator and that the assembly can be electrically coupled with a driving element of the actuator. An advantageous embodiment provides that a handwheel transmission is arranged between the manual actuating element and the generator. Besides providing a cost effective and simple embodiment, it is then possible also to retrofit any actuator with the assembly of the invention.

An essential advantage of the solution of the invention is, moreover, that, as a result of the purely electrical coupling of the actuator and the assembly of the invention, it is possible, for manual actuation of the actuator, to place the two components without problem spatially as far as desired from one another. This leads to the advantage that the supplemental constructions, which were previously required, are no longer needed to connect the manual actuating element with the remotely arranged actuator. Additionally, it is no longer required that parts of the manual actuating element in the electrical or electrical hydraulic drive of the actuator be provided in the mechanical construction of the gear train.

By the structural isolating of the manual actuating element from the actuator, it is possible, for the first time, to arrange the manual actuating element in any area accessible to operating personnel at any time. Thus, it is especially possible, as a result of the structural isolation, to assure a better reachability of the manual actuating element, to shift the actuating element from a danger zone to a non-endangered region and/or to arrange the actuating elements of different actuators at an easily accessible, central location.

In an advantageous further development of the assembly of the invention, it is provided that the assembly is coupled with the driving element in the housing of the actuator directly or via an intermediate circuit. Alternatively, it is provided that the assembly is coupled via a connecting cable with the driving element of the actuator directly or via an intermediate circuit.

Depending on the embodiment of the generator, such produces a direct voltage or a single phase, or multiphase, alternating voltage. An advantageous form of embodiment of the assembly of the invention provides a control unit, which ascertains from the polarity of the direct voltage produced by the generator or from the phase sequence of the multiphase alternating voltage produced by the generator the direction of action of the actuating element in the case of manual actuation. Derived from this can be the movement direction of the actuator for the purpose of closing or opening the assembly. The corresponding information concerning the direction of action of the actuating element or the movement direction of the actuator is provided, preferably on-site, for operating personnel.

Additionally or alternatively to the earlier stated form of embodiment, it is provided that on the assembly a switch element is provided, with which the direction of rotation of the actuator can be predetermined for the manual actuation.

In order to exclude an impermissible accessing of the assembly of the invention, an electrical or electronic security unit is provided, which is so embodied that an accessing of the assembly for the purpose of manual actuation of the actuator can occur only in the case of presence of a corresponding authorization. By way of example, the accessing is secured via a password, or access authorization can be issued via radio, e.g. with application of an REID tag. Furthermore, the release can occur via the superordinated control unit, or an electrical keypad is used. Of course, also other known access safeguards can be applied in connection with the invention. Especially, security can be provided via biometric data.

Especially advantageous is when the energy produced by the generator can be used for charging an optional emergency energy storer. The energy stored in the emergency energy storer is especially used to supply the actuator with energy during an interruption of the external energy supply. Thus, it is assured that the actuator is also fully operable in the case of disconnection of the external energy supply.

Very advantageous is furthermore when, in the case of loss of the external voltage supply, energy produced by the assembly is also usable for maintaining other important functions of the actuator. These functions can include:

opening or closing a braking or blocking system provided on the actuator;

actuating the electrical and/or electronic security unit;

activating a monitoring unit for monitoring torque transmitted to the output shaft of the actuator;

activating a control electronics for controlling velocity and/or monitoring travel path; (via the above mentioned measures—limiting the torque, the travel path or the velocity—damage as a result of improper use in hand operation can be prevented!)

communicating with a superordinated control unit;

signaling manual actuation of the actuator to the superordinated control unit or to the control electronics associated with the actuator; and activating an electrical, cam transmission provided at the assembly for signaling different states of the actuator or the assembly.

In order to prevent uncontrolled travel of the actuator in the case of manual actuation, an end position detection means is provided, which is so embodied that it reports to a user tactilely, optically or acoustically the reaching of a predetermined end position of the actuator. Additionally or alternatively, it is provided that a corresponding report is forwarded to the superordinated control unit.

Tactile feedback in the case of reaching the desired end position occurs, for example, by an increasing or decreasing of the actuating force of the manual actuating element. Also, an option is to achieve the tactile feedback by means of a vibration effect, in which the actuating force of the manual actuating element is alternately increased and decreased.

Advantages have been described, which compare the solution of the invention versus known solutions in the case of interruption of the external energy supply. The invention is, however, also advantageous, when the actuator is working normally: The assembly of the invention can be used to support the actuator and acts then as a servo drive. Especially, the assembly is, consequently, so embodied that it can also be used as a direction of rotation and velocity transducer for servomotor actuation of the actuator in the case of presence of the external voltage supply.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
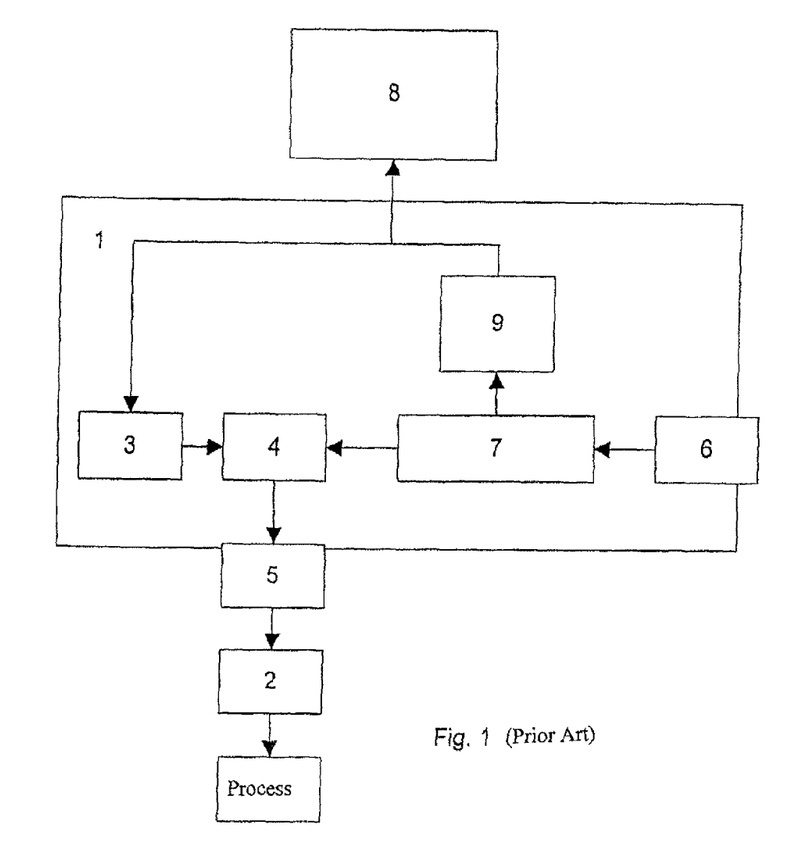
FIG. 1 is a schematic representation of a first form of embodiment of an actuator known from the state of the art for a machine, or apparatus, part.

FIG. 1 shows a schematic representation of a first form of embodiment of an actuator 1 known from the state of the art for a machine, or apparatus, part 2. The machine, or apparatus, part 2 is especially a control element, as described in the introduction of the description. Torque transmission between the driving element 3, especially an electrically or hydraulically driven motor, and the machine, or apparatus, part 2 occurs usually via a speed reduction transmission 4, which, depending on case of application, can be very differently embodied. The speed reduction transmission 4 is necessary, in order to convert the high RPM of the electric motor 3 into the desired output RPM for actuating the machine, or apparatus, part 2. The speed reduction transmission 4 can be any suitable type of transmission, examples of which have been mentioned above.

As already mentioned, the actuator 1 must be able to be operated separately via a manual actuating element 6 in an emergency. The manual actuating element 6 is, moreover, also used, for example, at start-up of the actuator 1. Actuating element 6 is usually an actuating, or hand, wheel, which is actuated manually by operating personnel, in order to bring the machine, or apparatus, part 2 into a desired position, respectively into an end position. Actuating element 6 can also be a crank or some other lever mechanism, e.g. a detent mechanism.

For the purpose of isolating hand operation and motor operation, a coupling, respectively clutch, mechanism 7 is provided. The coupling, respectively clutch, mechanism 7 is usually so embodied and/or arranged that, in motor operation, the driving element 3 is coupled with the output shaft 5 directly or indirectly via the transmission 4 and the manual actuation element 6 is uncoupled, while in hand operation, respectively manual actuation, the output shaft 5 is coupled with the manual actuating element 6 and the drive 3 is uncoupled. In this way, an isolation of motor operation from hand operation is achieved. The coupling, respectively clutch, mechanism 7 is preferably embodied in such a manner that the manual actuating element 6 is automatically uncoupled from the output shaft 5, as soon as the actuator 1 works in motor operation, thus in normal operation—motor operation thus has precedence over hand operation. The corresponding control occurs in the illustrated case via a clutch sensor system 9 associated with the clutch mechanism 7 and the control electronics 8, which activates the drive 3 corresponding to a report from the clutch sensor system 9.

Figure 2:
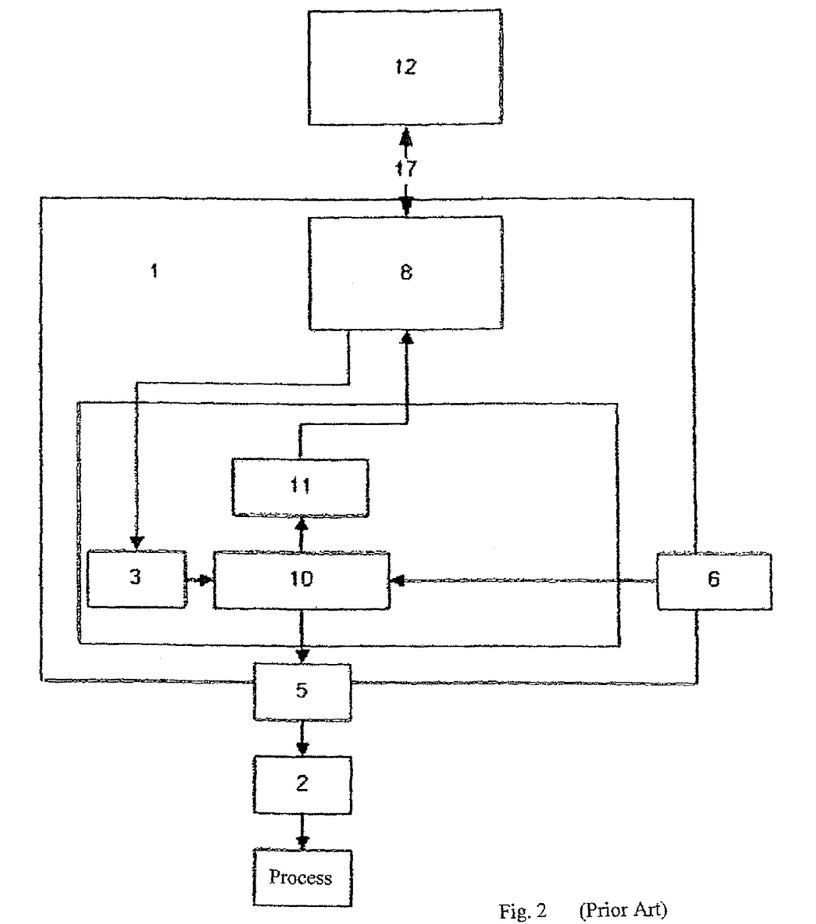
FIG. 2 is a schematic representation of a second form of embodiment of an actuator known from the state of the art for a machine, or apparatus, part.

In the case of the second form of embodiment of an actuator 1 illustrated in FIG. 2 and known from the state of the art for a machine, or apparatus, part 2, driving element 3 and manual actuating element 6 are connected with one another via a superimposed transmission 10. Associated with the superimposed transmission 10 is a position sensor 11, which forwards corresponding position information to the control electronics 8. Control electronics 8 is connected with a superordinated control station 12. Communication between the control electronics 8 and the control station 12 occurs via a bus system 17 embodied according to one of the bus protocols customary and/or standardized in automation technology.

Figure 3:
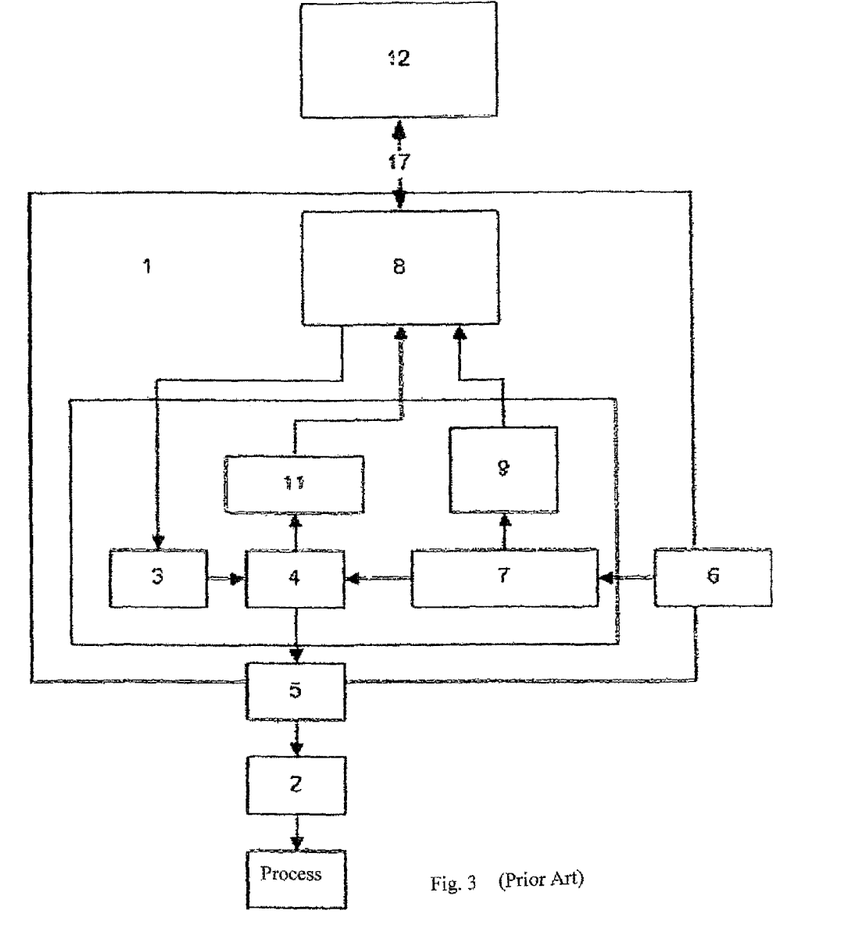
FIG. 3 is a schematic representation of a third form of embodiment of an actuator known from the state of the art for a machine, or apparatus, part.

FIG. 3 shows a schematic representation of a third form of embodiment of an actuator 1 known from the state of the art for a machine, or apparatus, part 2. Instead of the superimposed transmission 10 used in FIG. 2, here a transmission 4 is used. Provided between manual actuating element 6 and transmission 4 is a clutch mechanism 7 with a corresponding clutch sensor system 9. Switching between motor operation and hand operation occurs also here via the control electronics 8.

Figure 4:
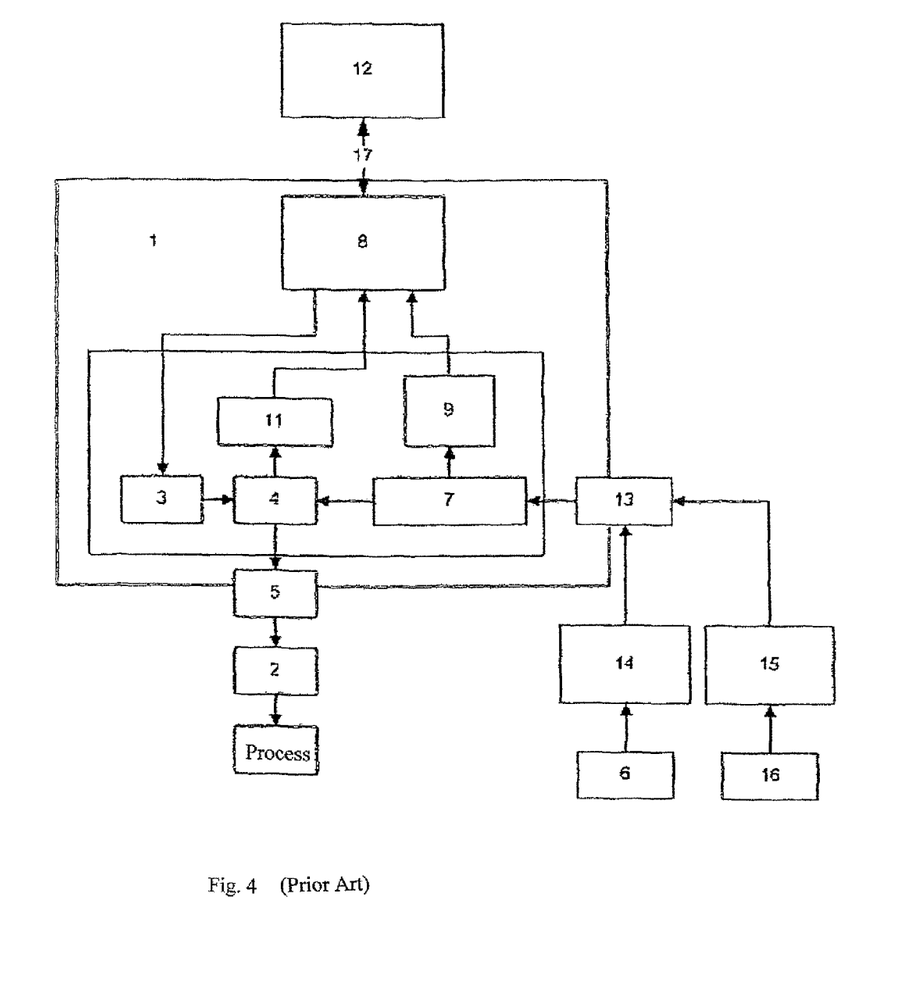
FIG. 4 is a schematic representation of a fourth form of embodiment of an actuator known from the state of the art for a machine, or apparatus, part.

The schematic representation shown in FIG. 4 of a fourth form of embodiment known from the state of the art of an actuator 1 for a machine, or apparatus, part 2 makes clear the effort, which must be undertaken, when the manual actuating element 6 of the actuator 1 is to be arranged spatially isolated. In this case, a number of supplemental constructions are required: A linking transmission 14 between the manual actuating element 6 and the coupling 13, an engaging lever 16 and an extended clutch mechanism 15, which has to be connected with the coupling 13. Otherwise, the form of embodiment shown in FIG. 4 corresponds to the form of embodiment illustrated in FIG. 3.

Figure 5:
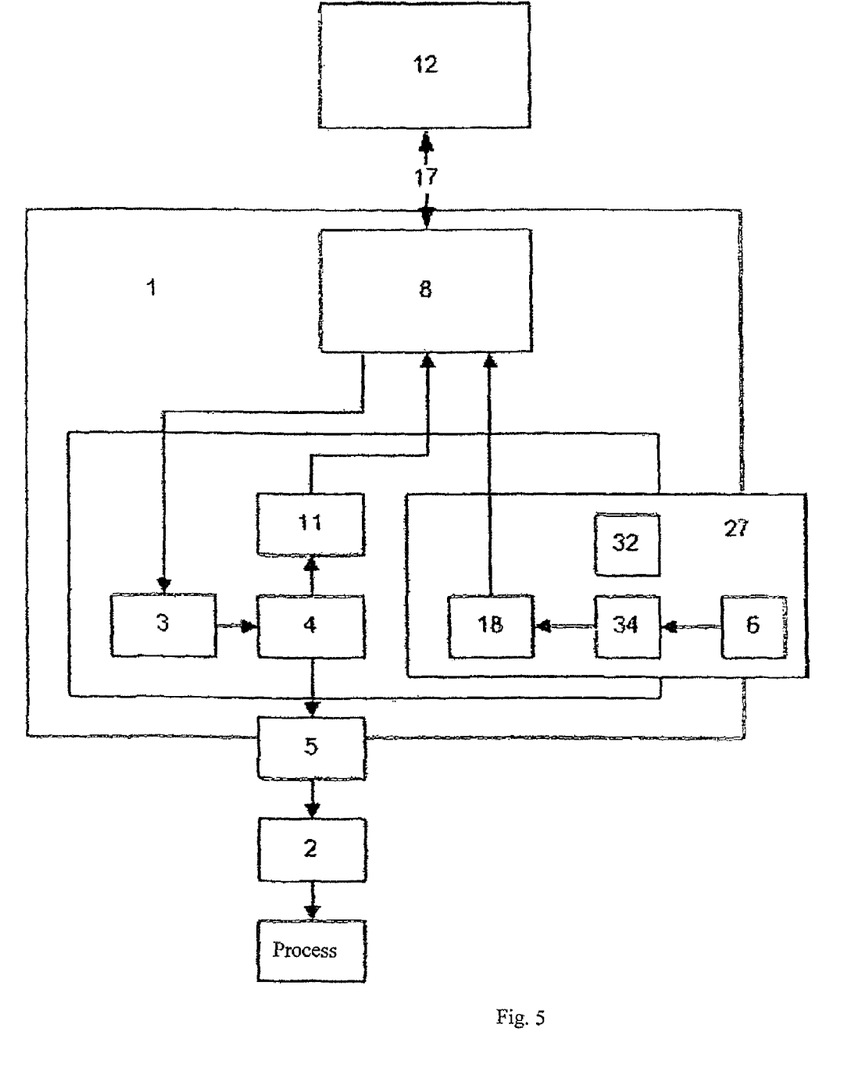
FIG. 5 is a schematic representation of a first form of embodiment of the actuator of the invention.

FIG. 5 shows a schematic representation of a first form of embodiment of the actuator 1 of the invention. In the shown form of embodiment, the machine, or apparatus, part 2 is in normal operation moved by the driving element 3 via the transmission 4 into the desired position. Control occurs via the control electronics 8. For this, there is associated with the transmission 4 a position sensor 11, which forwards corresponding position information to the control electronics 8. Control electronics 8 controls the switching between motor- and hand operation. Furthermore, control electronics 8 is connected with a superordinated control station 12. Communication between control electronics 8 and control station 12 occurs electrically according to any customary and/or standardized control method of automation technology.

The actuator 1 of the invention includes an assembly 27, which serves for electrical, manual, remote actuation of the actuator 1. The assembly 27 of the invention is composed of a manual actuating element 6, a generator 18 and, in given cases, a speed increasing or reducing, handwheel transmission 34. Examples of manual actuating elements 6 have already been named above, by way of example.

In case of malfunction, e.g. in the case of failure of the external energy supply 30 of the actuator 1, the machine, or apparatus, part 2 can be brought via the assembly 27 of the invention into the desired position. For this, the manual actuating element 6, embodied e.g. as a crank, is rotated by a service person. Through the conversion of mechanical energy into electrical energy, the control electronics 8 is supplied with the needed energy, in order to move the machine, or apparatus, part 2 with the driving element 3 into the desired position.

When the external energy supply is available, the machine, or apparatus, part 2 can likewise be brought via the assembly 27 of the invention into the desired position. For this, the manual actuating element 6, embodied e.g. as crank, is rotated by a service person. The control electronics of the drive 8, respectively an optional handwheel control electronics 32 of the assembly 27, detects, based on the polarity, respectively the phase relationship, of the energy produced, respectively based on the position of a switch element and based on the amplitude of the energy produced, the rotational direction specification and the velocity specification for servomotor actuation of the drive 1.

As already earlier mentioned, furthermore, an emergency energy storer 29 can be charged, as soon as the manual actuating element 6 is actuated. Via the energy stored in the emergency energy storer 29, an option is to maintain the above mentioned, supplemental functions of the actuator 1. Thus, all essential components of the actuator can be supplied with the needed energy also in the case of failure of the external energy supply 30.

Figure 6:
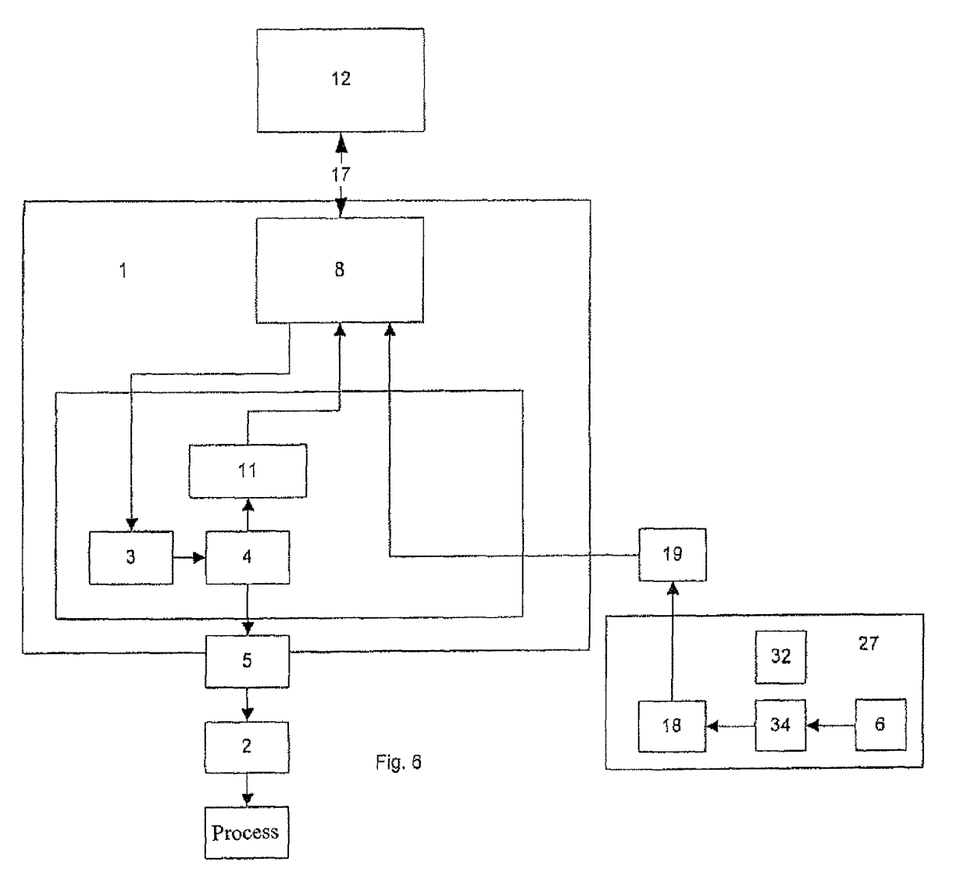
FIG. 6 is a schematic representation of a second form of embodiment of the actuator of the invention.

In the case of the schematic representation shown in FIG. 6 of a second form of embodiment of the actuator 1 of the invention, the assembly 27 is spatially separated from the actuator 1. Preferably, the assembly 27 is arranged in a separate housing 31 and, thus, embodied as an independent module. Assembly 27 is connected with the control electronics via a connecting cable 19. The advantages of this embodiment and the options, which this embodiment enables, have already been explained above, so that repetition here is omitted.

Figure 7:
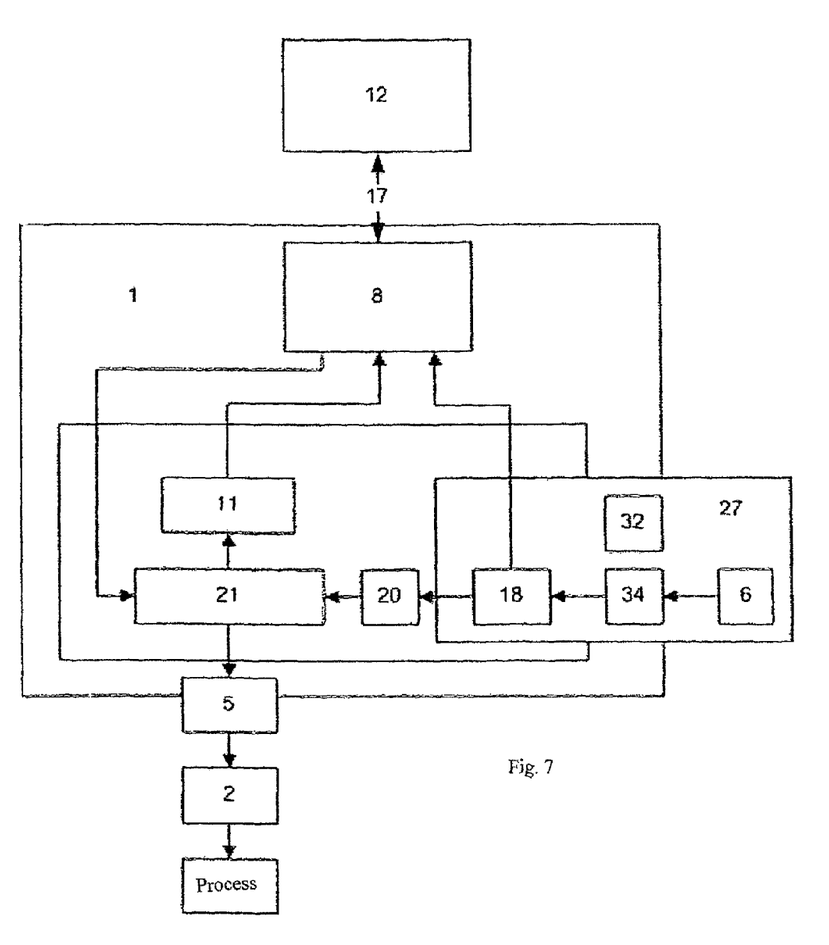
FIG. 7 is a schematic representation of a third form of embodiment of the actuator of the invention.

While in FIGS. 5 and 6 the actuator 1 is actuated via an electric motor as driving element 3, the embodiment shown in FIG. 7 has a hydraulic drive. For the case, in which the machine, or apparatus, part 2 is actuated in hand operation, a corresponding report is forwarded from the generator 18 to the control electronics 8. Furthermore, the control electronics 8 is supplied with energy by the generator 18. Moreover, the generator 18 supplies the hydraulic pump 20 with energy. The hydraulic actuator 21 is supplied with energy via the hydraulic pump 20.

Figure 8:
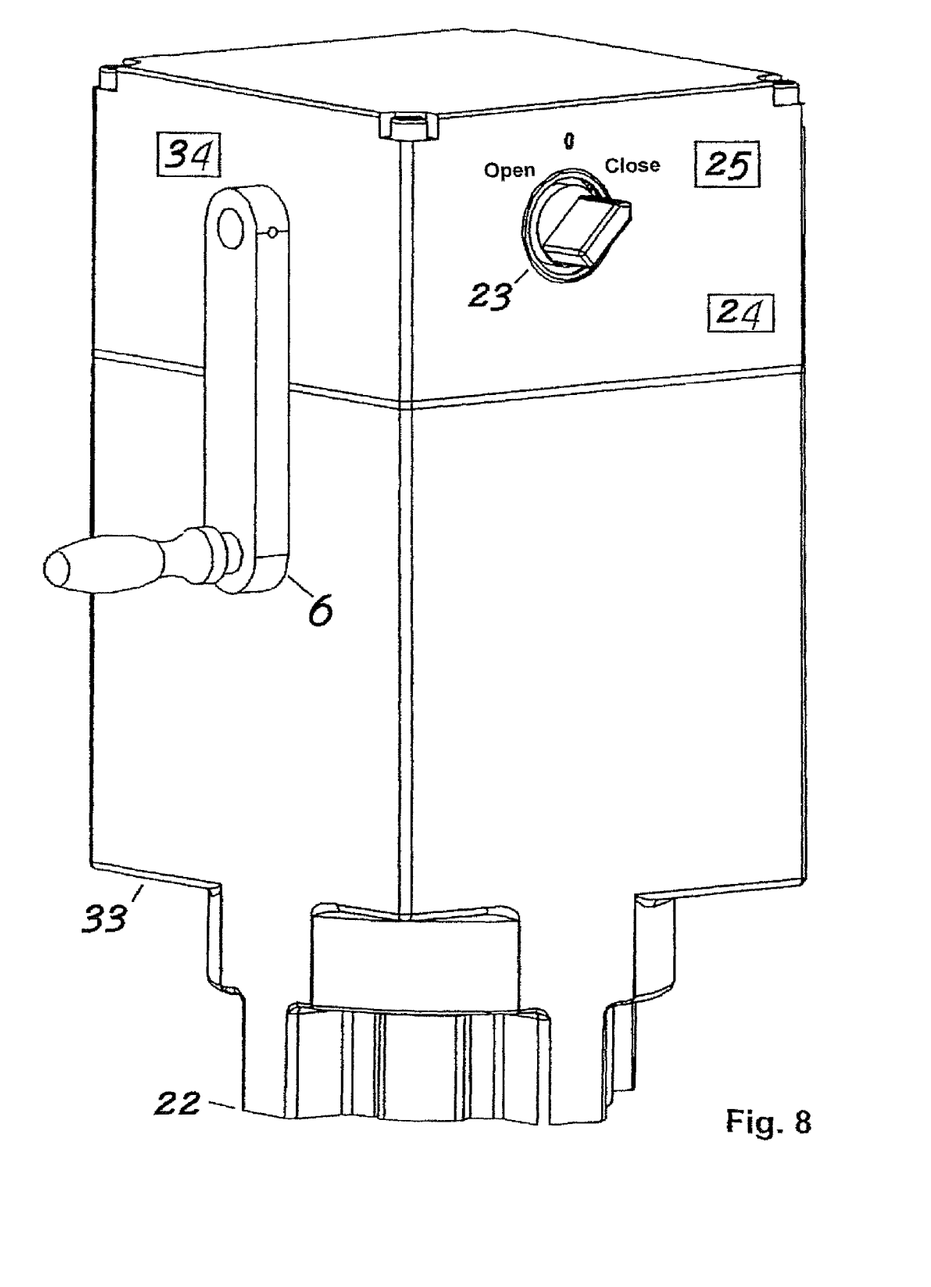
FIG. 8 is an external view of a first preferred embodiment of the assembly of the invention.

FIG. 8 shows an external view of a first preferred embodiment of the assembly 27 of the invention integrated in the drive 1. The assembly 27, composed of the generator 18 (not separately shown in FIG. 8), the manual actuating element 6 embodied as a crank and, in given cases, a speed increasing or reducing, handwheel transmission 34, is arranged in the drive housing 33.

Figure 9:
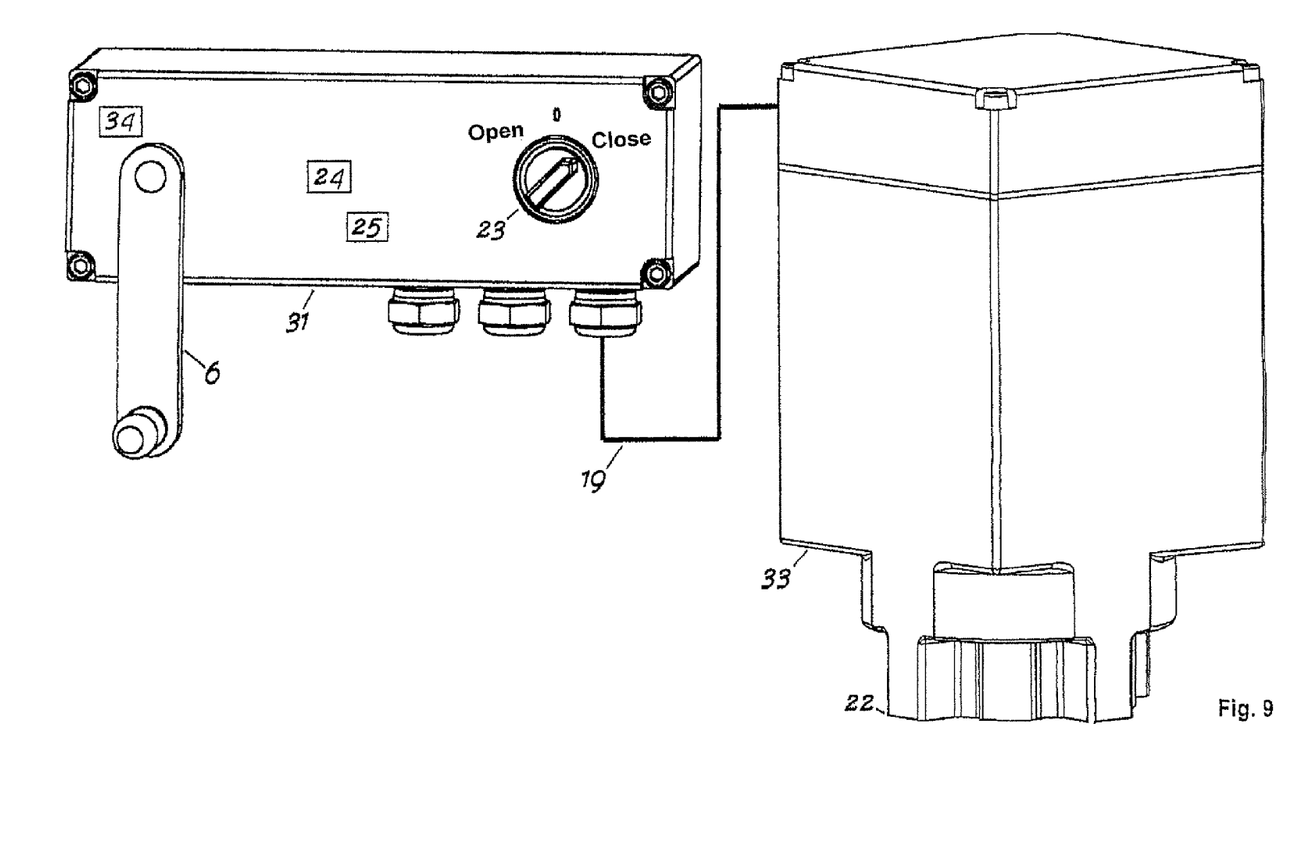
FIG. 9 is an external view of a second preferred embodiment of the assembly of the invention.

FIG. 9 shows an external view of a second preferred embodiment of the assembly 27 of the invention arranged separately from the drive 1 in the handwheel housing 31. The assembly 27 forms here, thus, an independent module, which can also be connected without problem subsequently with a conventional electrical or hydraulic actuator 1. The connection of the module, respectively the assembly 27, with the control electronics 8 occurs, for example, electrically via a connecting cable 19.

Furthermore, there is provided on the housing 31 and/or in the housing 33, in which the assembly 27 is accommodated, an electrical or electronic, security unit 24. Security unit 24 is so embodied that an accessing of the assembly 27 for the purpose of manual actuation of the actuator 1 is only possible in the case of presence of a corresponding authorization. Examples of how the security unit 24 can be embodied have already been described above.

Further associated with the assembly 27, respectively the module, of the invention is the end position signal 25. End position signal 25 is preferably so embodied that, in the case of manual actuation of the actuator 1, the reaching of a predetermined position, respectively a desired end position, is indicated to the service person tactilely, optically or acoustically. The service person knows, thus, directly, when the machine, or apparatus, part 2 has reached the desired end position. In this way, a traveling beyond the end position is effectively prevented. Alternatively or in addition, it is provided that, upon the reaching of the end position, a corresponding report is forwarded to the superordinated control unit 12.

Furthermore, there is provided on the assembly 27, respectively on the housing 31, respectively on the housing 33, in which the assembly 27 is implemented, a switch element 23, with which the direction of rotation of the actuator 1 can be predetermined in the case of manual actuation. Thus, the service person can, e.g. by moving the switch element 23 to the position "CLOSE", assure that, in the case of a manual actuation of the actuating element 6—independently of the respectively selected direction of rotation—the machine, or apparatus, part 2 is moved into the closed position.

The invention claimed is:

1. An apparatus for automation technology, comprising:
   an actuator for moving a machine, or apparatus, part into a desired position;
   an electrical drive or an electro-hydraulic drive as a driving element for said actuator;
   a transmission which converts high RPM of said electrical or electro-hydraulic drive into a constant output RPM for moving the machine, or apparatus, part;
   a manual actuating element; a control electronics;
   a position sensor; and
   a generator; wherein:
   said manual actuating element and said generator form an assembly for manual electrical remote actuation of said actuator;
   said assembly is electrically coupled with said driving element of said actuator and said control electronics; and
   said control electronics is supplied in manual operation with the needed energy as a result of conversion of mechanical energy into electrical energy, in order to move the machine, or apparatus, part by means of said driving element into the desired position.

2. The apparatus as claimed in claim 1, further comprising:
   a position sensor associated with said transmission, wherein:
   said position sensor forwards corresponding position information to said control electronics.

3. The apparatus as claimed in claim 1, wherein:
   said assembly is coupled with said driving element in a housing of said actuator directly or via an intermediate circuit, or
   said assembly is coupled via a connecting cable with said driving element of said actuator directly or via an intermediate circuit.

4. The apparatus as claimed in claim 1, wherein:
   said control electronics, derives from a polarity of a direct voltage produced by said generator or from a phase sequence of a multiphase alternating voltage produced by said generator, a direction of action of said manual actuating element of said actuator.

5. The apparatus as claimed in claim 1, wherein:
   on said assembly a switch element is provided, with which a direction of rotation of said actuator is predeterminable in a case of manual actuation.

6. The apparatus as claimed in claim 1, wherein:
   energy produced by said assembly can be used for charging an emergency energy storer; and
   energy stored in said emergency energy storer is used to supply said actuator with energy during an interruption of an external energy supply of said actuator.

7. The apparatus as claimed in claim 1, wherein:
   on said assembly an electrical or electronic security unit is provided, which is so embodied that an accessing of said assembly for the purpose of manual actuation of said actuator can occur only in a case of presence of a corresponding authorization.

8. The apparatus as claimed in claim 1, wherein:
   in a case of failure of an external voltage supply, energy produced by manual actuation of said actuator is usable for at least one of the following functions:
   opening or closing a braking or blocking system provided on said actuator;
   actuating an electrical and/or electronic security unit;
   activating a monitoring unit for torque transmitted to an output shaft of said actuator;
   activating a calculating/sensor unit for controlling velocity and/or monitoring travel path;
   communicating with a superordinated control unit;
   signaling manual actuation of said actuator to a superordinated control unit or to control electronics associated with said actuator; and
   activating an electrical cam transmission provided at said assembly or in said actuator for signaling different states of said actuator or said assembly.

9. The apparatus as claimed in claim 1, wherein:
said assembly is so embodied that it is used as a direction of rotation and velocity transducer for servomotor actuation of said actuator in a case of the presence of the external voltage supply.

10. The apparatus as claimed in claim 8, wherein:
an end position detection means is provided, which is so embodied that it reports to a user tactilely, optically or acoustically the reaching of a predetermined end position in the case of manual actuation of said actuator and/or a corresponding report is forwarded to a superordinated control unit.

\* \* \* \* \*